July 29, 1969  W. A. STANLEY  3,458,245
RETRO-REFLECTIVE REFLECTORS
Filed Aug. 15, 1966  7 Sheets-Sheet 1

INVENTOR.
WALLACE A. STANLEY
BY
Barnes, Kisselle, Raisch & Choate
ATTORNEYS

July 29, 1969  W. A. STANLEY  3,458,245
RETRO-REFLECTIVE REFLECTORS
Filed Aug. 15, 1966  7 Sheets-Sheet 3

INVENTOR.
WALLACE A. STANLEY
BY
Barnes, Kisselle, Raisch & Choate
ATTORNEYS

July 29, 1969  W. A. STANLEY  3,458,245
RETRO-REFLECTIVE REFLECTORS
Filed Aug. 15, 1966  7 Sheets-Sheet 4

INVENTOR.
WALLACE A. STANLEY
BY
Barnes, Kisselle, Raisch & Choate
ATTORNEYS

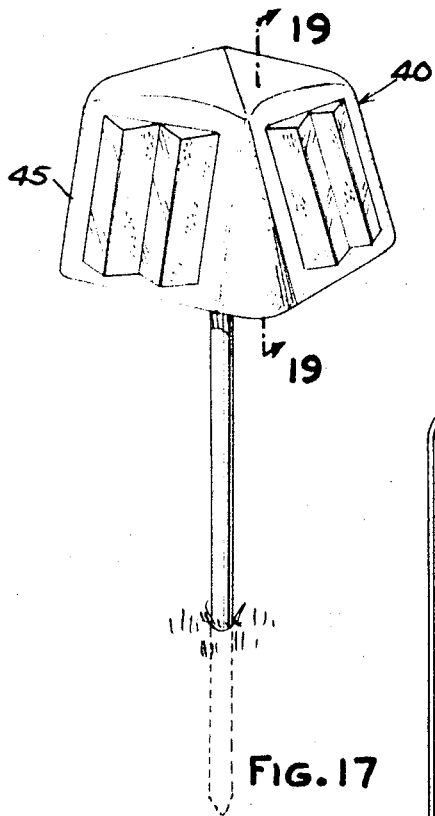
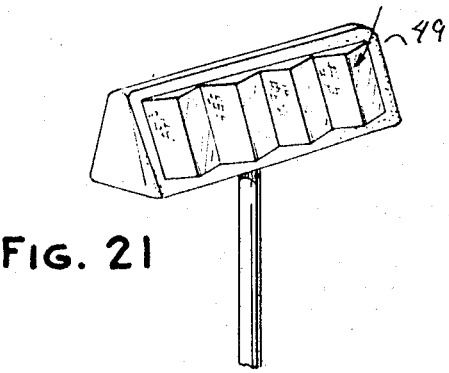
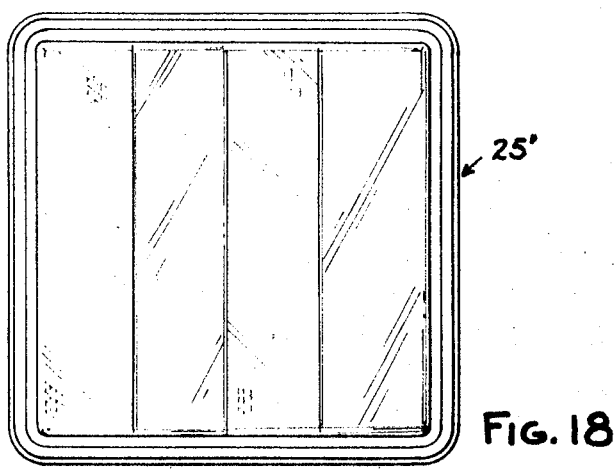
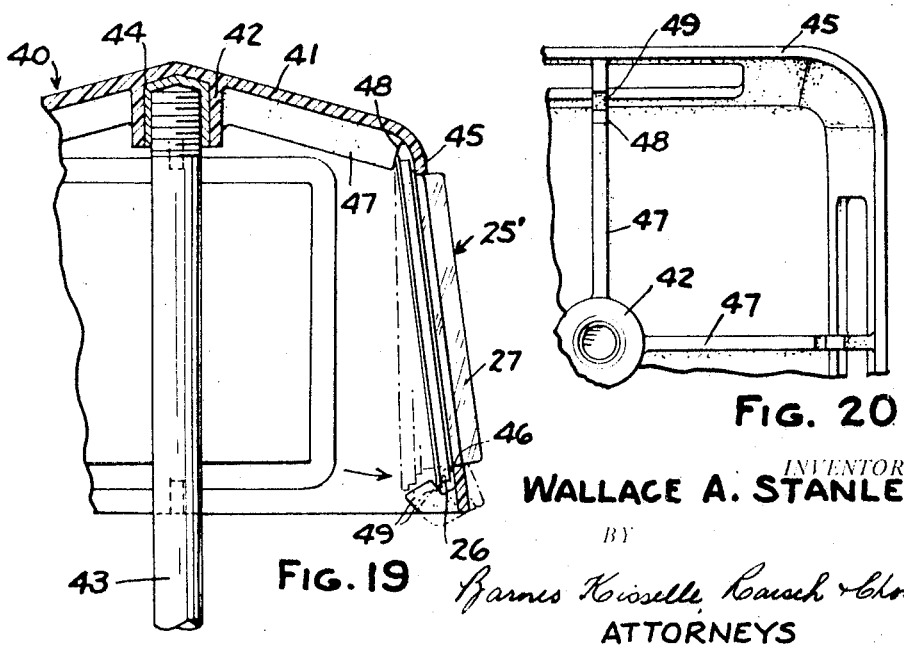

July 29, 1969     W. A. STANLEY     3,458,245
RETRO-REFLECTIVE REFLECTORS
Filed Aug. 15, 1966     7 Sheets-Sheet 6
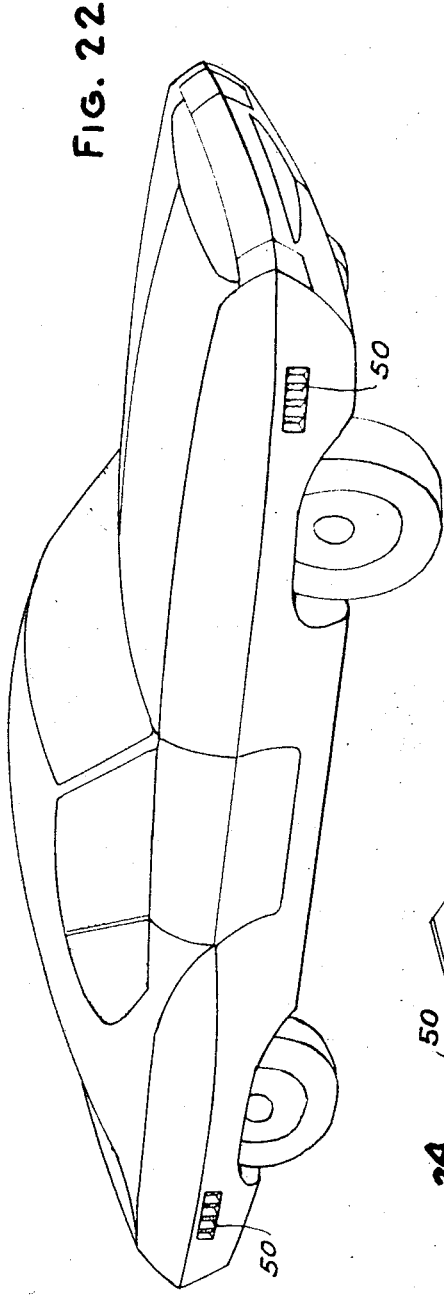
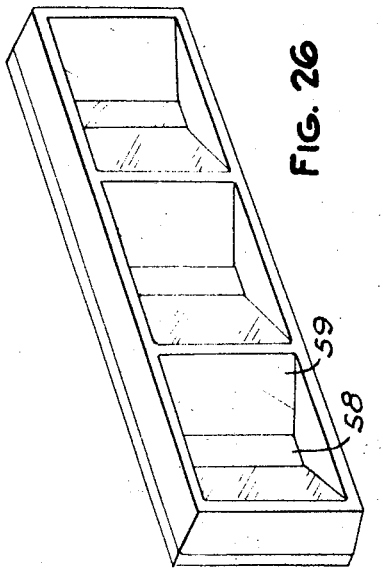
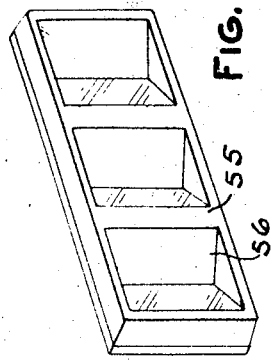
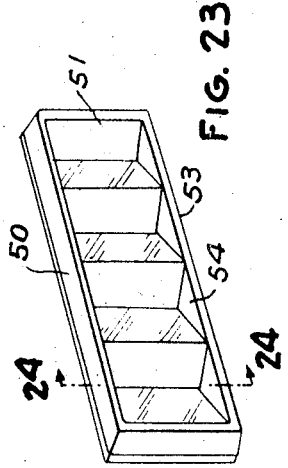
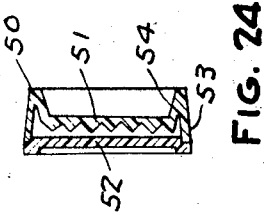
INVENTOR.
WALLACE A. STANLEY
BY
*Barnes, Kisselle, Raisch & Choate*
ATTORNEYS July 29, 1969 W. A. STANLEY 3,458,245
RETRO-REFLECTIVE REFLECTORS
Filed Aug. 15, 1966 7 Sheets-Sheet 7
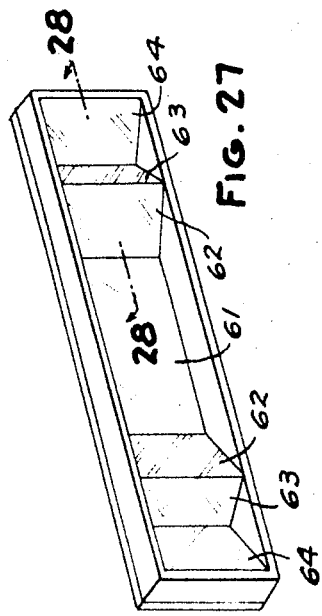
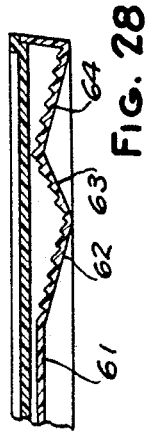
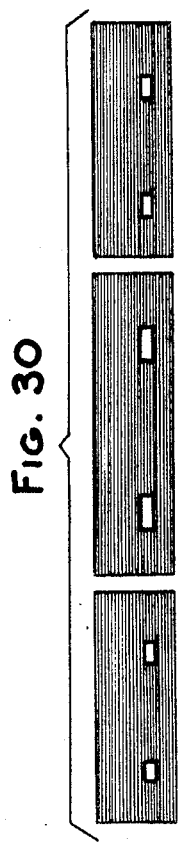
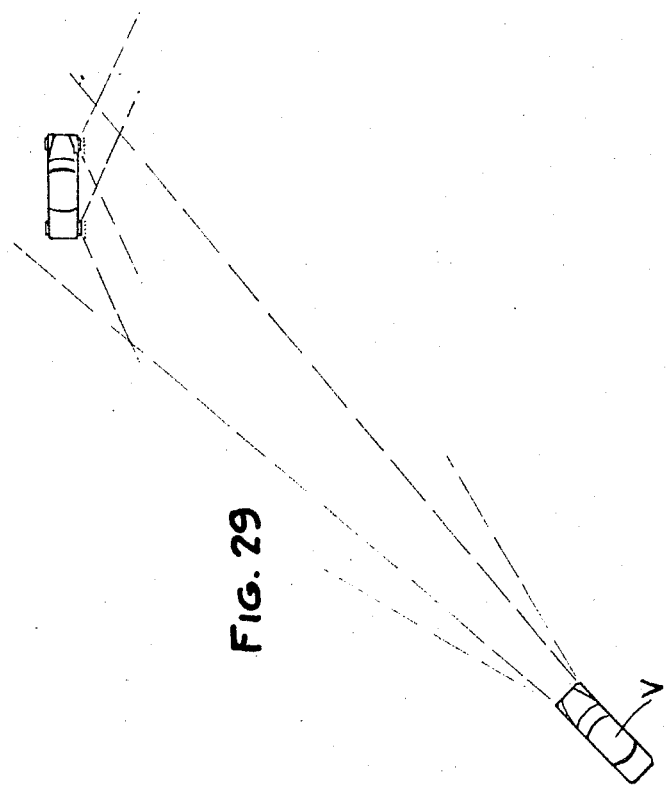
INVENTOR.
WALLACE A. STANLEY
BY
ATTORNEYS United States Patent Office 3,458,245
Patented July 29, 1969

3,458,245
RETRO-REFLECTIVE REFLECTORS
Wallace A. Stanley, Bloomfield Hills, Mich., assignor, by mesne assignments, to Reflex Corporation of Canada, Limited, Windsor, Ontario, Canada, a corporation of Canada
Filed Aug. 15, 1966, Ser. No. 572,261
Int. Cl. G02b 5/12
U.S. Cl. 350—67                                8 Claims

ABSTRACT OF THE DISCLOSURE

A retro-reflector comprising an inner wall and an outer wall spaced from the inner wall and hermetically sealed thereto. The outer wall is preferably made in a single piece of translucent material and has at least two, preferably four or more, substantially flat surfaces which are angularly related to one another at an obtuse angle and form an acute angle with the inner wall. The surfaces of the outer wall opposite the flat surfaces are formed with a plurality of symmetrical retro-reflective prisms, the axes of said prisms being substantially perpendicular to the respective substantially flat outer surfaces.

---

This invention relates to retro-reflective reflectors which are adapted to reflect light back to the eyes of an observer in a vehicle or aircraft.

Retro-reflective reflectors have been known for some time. Such reflectors conventionally comprise an outer flat wall such as a wall of glass or plastic which has a smooth outer surface and a plurality of retro-reflective prisms on the inner surface which reflect back light from an oncoming vehicle. Such reflectors are conventionally incorporated on vehicles and along roadways in the form of standardized flat circular reflectors that have a reflective surface of about seven square inches. Althuogh such reflectors are very bright when illuminated by light directed perpendicular to the flat outer surface, they rapidly lose their efficiency when light is directed against the reflectors at an angle.

Among the object of the invention are to provide a retro-reflective reflector which has high brilliance both at wide angles and head on; which is in the form of a module; which can be readily mounted on a vehicle; which can be utilized on the side of a vehicle to provide visibility even though the headlights and tail lights of the vehicle are not visible; which can be used in pairs at the intersection of side and end surfaces of a vehicle to cause effective operation at the intersection of the side and end surfaces; which can be used to provide a novel airport taxiway strip marker; and to provide a module which meets and exceeds all of the present standards of testing retro-reflective reflectors.

Specifically, the retro-reflective reflector embodying the invention comprises an inner wall and an outer wall spaced from the inner wall and hermetically sealed thereto. The outer wall is preferably made in a single piece of translucent material and has at least two, preferably four or more, substantially flat surfaces which are angularly related to one another at an obtuse angle and form an acute angle with the inner wall. The surfaces of the outer wall opposite the flat surfaces are formed with a plurality of symmetrical retro-reflective prisms, the axes of said prisms being substantially perpendicular to the respective substantially flat outer surfaces.

Figure 1:
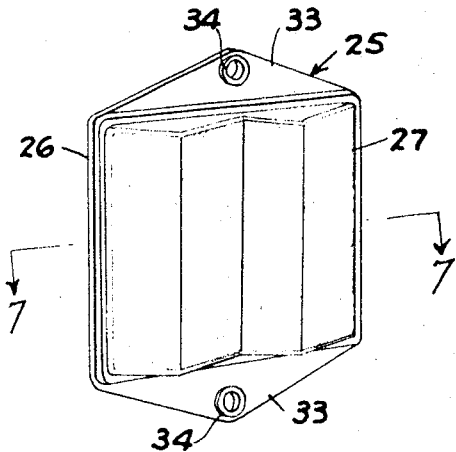
Figure 2:
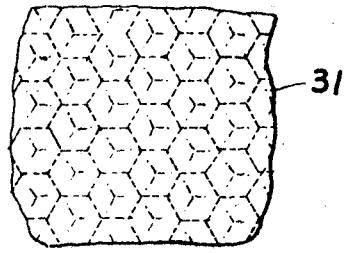
Figure 3:
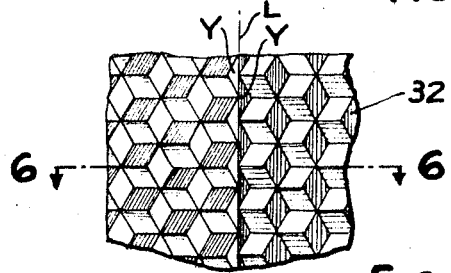
Figure 4:
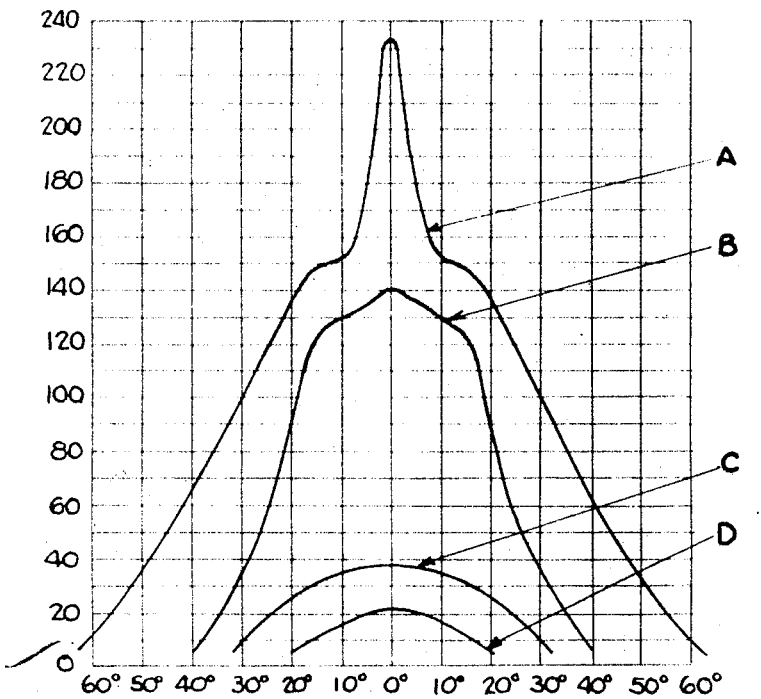
Figure 5:
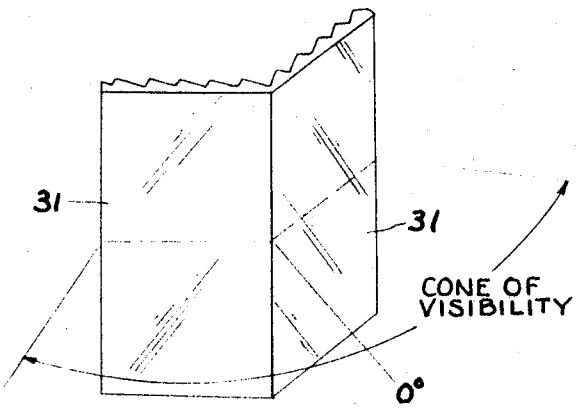
Figure 6:
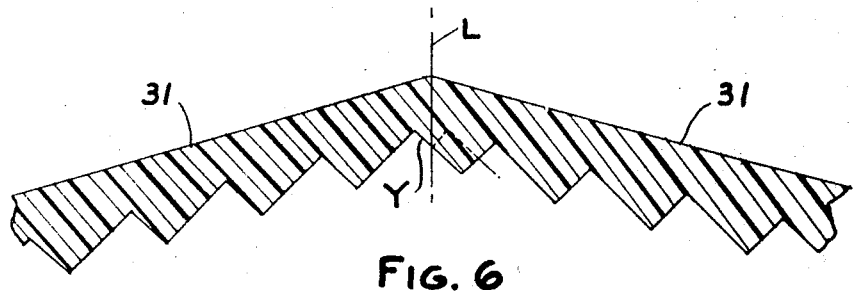
Figure 7:
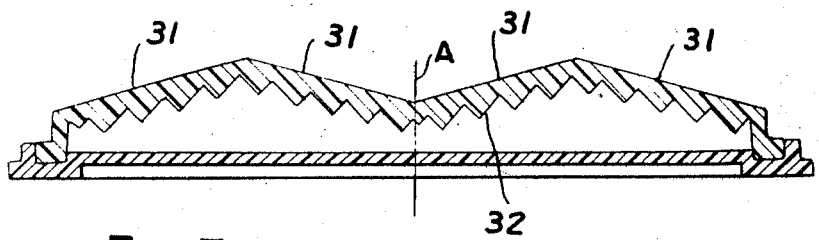
Figure 9:
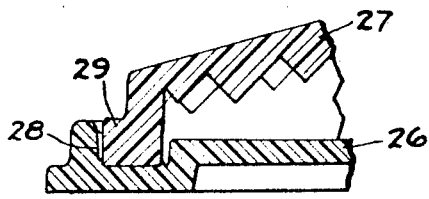
Figure 10:
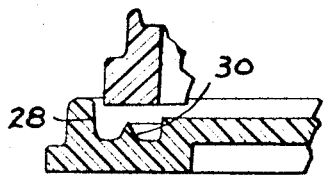
Figure 8:
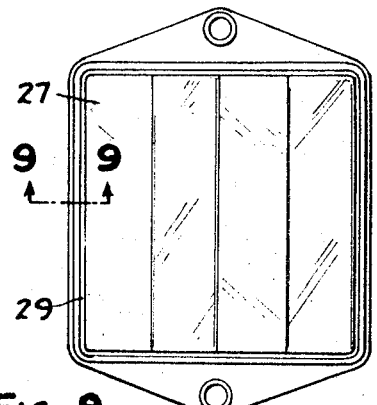
Figure 12:
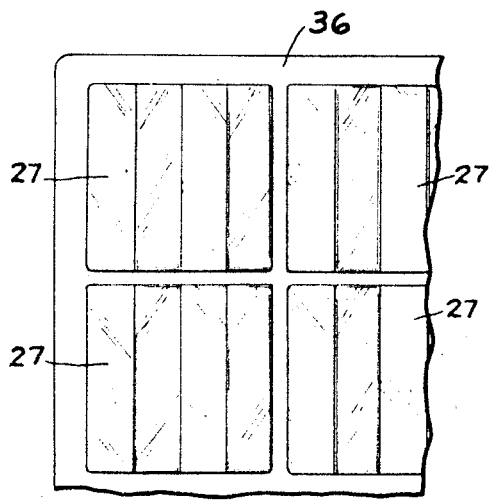
Figure 11:
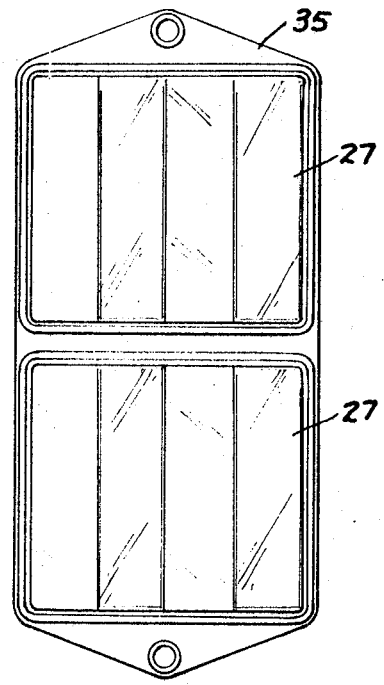
Figure 13:
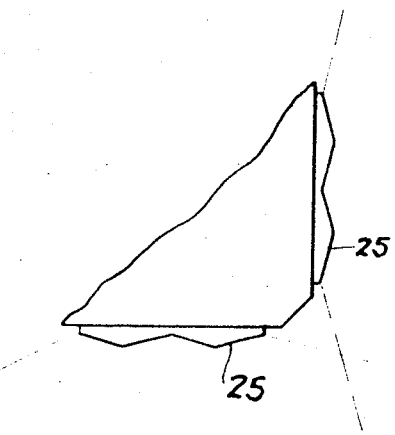
Figure 14:
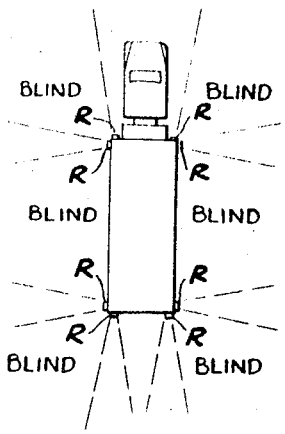
Figure 15:
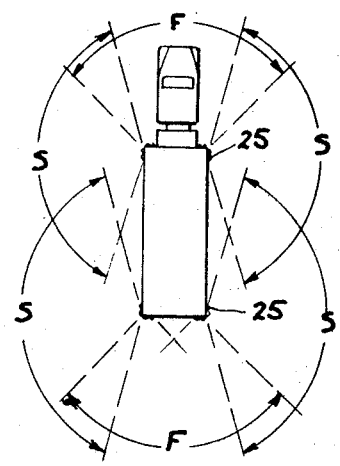
Figure 16:
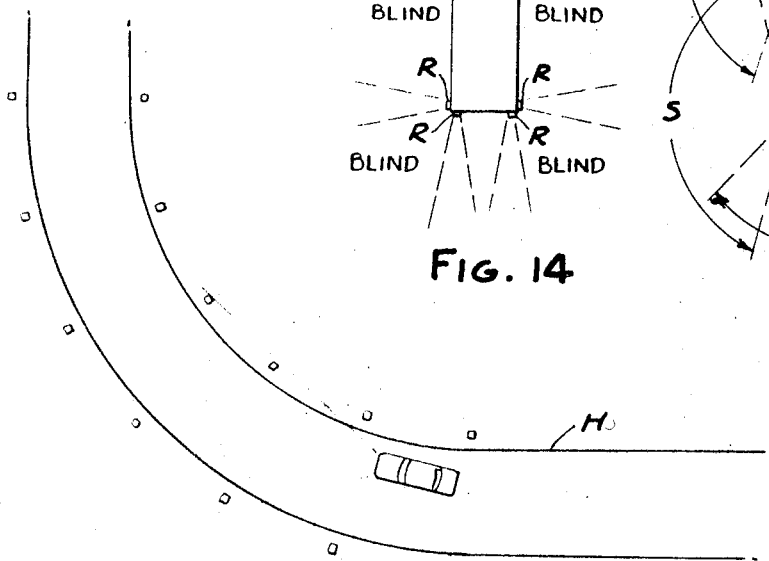

In the drawings:
FIG. 1 is a perspective view of a retro-reflective reflector embodying the invention.
FIG. 2 is a view normal to one of the outer surfaces of the reflector shown in FIG. 1.
FIG. 3 is a fragmentary view normal to one of the inner surfaces of the reflector shown in FIG. 1, that is, in a direction opposite of that shown in FIG. 2.
FIG. 4 is a series of photometric curves.
FIG. 5 is a fragmentary partly diagrammatic view showing the manner in which a portion of the retro-reflective reflector embodying the invention increases the angular efficiency of the reflector.
FIG. 6 is a fragmentary sectional view taken along the line 6—6 in FIG. 3.
FIG. 7 is a sectional view taken along the line 7—7 in FIG. 1.
FIG. 8 is a plan view of the reflector shown in FIG. 1.
FIG. 9 is a fragmentary sectional view taken along the line 9—9 in FIG. 8.
FIG. 10 is a view similar to FIG. 9 showing the relative positions of the parts during assembly.
FIG. 11 is a plan view of a modified form of the reflector.
FIG. 12 is a fragmentary plan view of a further modified form of the reflector.
FIG. 13 is a partly diagrammatic plan view showing the manner in which reflectors such as shown in FIG. 1 may be mounted on a vehicle.
FIG. 14 is a diagrammatic plan view showing the problem to which the arrangement shown in FIG. 13 is directed.
FIG. 15 is a diagrammatic plan view showing the manner in which the reflector arrangement shown in FIG. 13 solves the problem shown in FIG. 14.
FIG. 16 is a diagrammatic plan view showing the manner in which the reflectors may be mounted along a highway.
FIG. 17 is a perspective view of an airport taxiway strip marker.
FIG. 18 is a plan view of a reflector unit utilized in the airport marker shown in FIG. 17.
FIG. 19 is a fragmentary sectional view taken along the line 19—19 in FIG. 17.
FIG. 20 is a bottom plan view of the marker shown in FIGS. 17 and 19.
FIG. 21 is a fragmentary perspective view of a modified form of airport marker.
FIG. 22 is a perspective view of an automobile embodying the invention.
FIG. 23 is a perspective view of a reflector utilized in the automobile shown in FIG. 22.
FIG. 24 is a sectional view taken along the line 24—24 in FIG. 23.
FIGS. 25, 26 and 27 are perspective views of further modified forms of reflectors.
FIG. 28 is a fragmentary sectional view taken along the line 28—28 in FIG. 27.
FIG. 29 is a partly diagrammatic plan view showing the manner in which the reflectors on the automobile of FIG. 22 operate to make the automobile visible at wide angles.
FIG. 30 are partly diagrammatic elevational views showing the manner in which the reflectors on the automobile shown in FIG. 22 are operable to make the automobile visible at wide angles.

Referring to FIG. 1, the reflector 25 embodying the invention comprises an inner wall or base 26 and an outer wall 27 hermetically sealed about its periphery to the base 26 in spaced relation to the base. Both the inner and outer walls are preferably made of plastic, the inner wall preferably being made of acrylonitrile butadiene styrene and the outer wall being made of transparent plastic such as acrylic plastic in either clear, amber, red or other color depending upon its usage.

As shown in FIG. 9, the base 26 is formed with a peripheral groove 28 into which a peripheral bead 29 on the outer wall extends. In practice, a fusion bead or lip 30 is formed in the base of the groove 28 (FIG. 10) and the hermetic seal between the base of the groove and the bead 29 is achieved by electronic fusion, the lip 30 facilitating this fusion in accordance with well-known practice.

As shown in FIG. 7, the outer wall 27 is provided with a plurality of angularly related substantially flat outer surfaces 31. Adjacent surfaces form obtuse angles with one another and alternate surfaces are parallel with one another. The surfaces 31 are adapted to extend vertically in use. The inner surface of the outer wall 27 is formed with a plurality of retro-reflective prisms 32 which are preferably cubic and symmetrical with their axes substantially perpendicular to the flat outer surfaces with which they are associated. Such prisms are well known and shown, for example, in the Stimson Patent 1,591,572. When light is directed substantially normal to the outer flat surfaces, said prisms redirect the light by reflection on the three adjacent cubic surfaces toward the exterior in a direction normal to the surface portion 31.

As shown in FIG. 3, the prisms on adjacent pairs of outwardly directed portions of the wall 27 are symmetrically disposed with respect to the apex formed by the outer surfaces 31 and have cubic ends defining hexagonal bases so that three surfaces are defined thereby at angles of 90° relative to one another. In addition, the prisms are oriented with respect to the apex line L in such a fashion that one of the lines of intersection extends at right angles to the line L and away from the line L. One of the surfaces of each prism thus faces the line L. As further shown in FIG. 3, at the line L partial prisms are provided on each side of the line as represented by the surfaces Y that extend downwardly from the apexes of the adjacent partial prisms.

It has been found that most effective angular reflection will occur when the surfaces 31 form obtuse angles with one another of approximately 150°. In other words, the angle which each surface 31 makes with a plane parallel to the inner wall 26 is preferably 15°. However, the angle may range between 5° and 20°, the greater the angle the greater angular efficiency of the reflector. As will be more clearly described hereinafter where the angle that the surfaces 31 makes is between 20 and 30°, it is preferred to utilize at least some surfaces on the reflector that are parallel to the inner wall 26 in order that the reflector will have sufficient brilliance in a direction normal thereto.

The manner in which the reflector embodying the invention functions to increase the angular efficiency of the overall reflector can be more readily understood by reference to FIGS. 6 and 7. As shown in FIG. 7, each of the surfaces 31 functions with maximum efficiency in reflecting light which is directed against the respective surfaces in a direction normal to the surfaces 31. The reflecting surface portions 31 are less efficient in reflecting the light rays which are directed against the surface portions at acute angles other than perpendicular. By providing two associated angularly related surfaces 31, the maximum efficiency or brilliance is increased as contrasted to the rays that would be reflected with maximum efficiency if the entire surface were flat.

By providing a second pair of angularly related surfaces as shown in FIG. 7, it can be seen that the efficiency of the overall reflector will be increased.

The manner in which the invention solves the problem can further be more readily understood with reference to FIG. 4 which is a series of photometric curves of candle-power versus angular relation of the light beam to the reflector. The curve D represents the minimum photometric requirements of the Society of Automotive Engineers for a Class A clear reflector. The curve C shows the photometric readings for a flat conventional three-inch round reflector such as is presently used which has an effective area of seven square inches. Curve B shows the photometric readings of a flat three-inch round reflector made in accordance with the method and apparatus set forth in the copending application of Wallace A. Stanley et al., Ser. No. 328,333 filed Dec. 5, 1963. As contrasted to the S.A.E. requirements and the conventional three-inch round highway reflector, the reflector of the present invention having effective area of approximately seven square inches had the photometric readings shown in the topmost curve A.

It is readily apparent that the reflector of the present invention far exceeds the basic S.A.E. requirements and at the same time greatly increases the angular efficiency of the reflector.

The curve A shown in FIG. 4 is based upon data obtained by independent testing facilities in accordance with conventional S.A.E. tests.

In addition it has been found that the reflector meets all of the requirements such as color, plastic stability, dust seal, moisture seal, rain and spray tests, corrosion tests and shock tests.

Referring to FIGS. 1 and 8, the reflector can be readily mounted on a vehicle by the use of integral extensions 33 on the base 26 which have reinforced openings 34 whereby the reflector can be mounted on the vehicle. As previously noted, when mounted on the vehicle the surface portions 31 extend generally vertically with the intersecting apexes extending vertically.

In the form of the invention shown in FIG. 11, a pair of outer walls 27 are mounted on an enlarged base 35 to form a double reflector.

In the form of the invention shown in FIG. 12, a plurality of outer walls 27 are mounted on a single base 36.

Because of the wider angular efficiency of the reflectors embodying the invention, the reflectors can be mounted at the area juncture of angularly related surfaces of a vehicle which normally provided blind spots. Thus as shown in FIG. 14, where conventional flat reflectors R have been provided at the side and end surfaces of a vehicle, the vehicle has been "blind" with respect to oncoming light beams in the areas marked blind. However if the reflectors 25 are mounted as shown in FIGS. 13 and 15, the blind areas are eliminated so that the light from oncoming vehciles will be reflected thereby increasing the safety in the event the vehicle is parked or disabled.

Referring to FIG. 16, the use of the reflectors embodying the invention along a highway H permits the reflectors to be spaced at greater intervals along the highway and at the same time provide for greater visibility because of the ability to reflect light which is other than normal to the reflector surfaces. As a result, there is a great saving in the cost of both the reflectors and the supports as well as a greater efficiency from the standpoint of view of the driver of the oncoming vehicle.

The basic reflector unit shown in FIGS. 1 and 8 can be utilized by the elimination of the flanges 31 as shown at 25¹ in FIG. 18 to form an airport taxiway strip marker of increased efficiency. Such an airport marker is shown in FIG. 17 and comprises a housing 40 which is preferably made of plastic such as acrylonitrile butadiene styrene and comprises a top wall 41 having a tubular extension 42 on the underside thereof into which a pipe or similar support 43 may be threaded by the use of an intermediate plastic threaded fitment 44. The housing 40 includes an integral downwardly extending peripheral wall that has four substantially flat portions 45 which are inclined downwardly and outwardly as shown in FIGS. 17 and 19. Each wall portion 45 includes a rectangular opening 46 into which the reflector unit 25¹ extends. The size of the opening 46 is such that the outer wall 27 readily passes through the opening but the inner wall 26 engages around the opening. As shown in FIGS. 20 and 21, the top wall 41 of the housing 40 is formed with downwardly extending ribs 47 which not only reinforce the top wall but also have free edges 48 spaced from the wall portions 45 to form a recess for the upper edge of the base or inner wall 26 of each reflector unit 25¹. Each wall portion 45 is formed with a locking hook or integral finger 49 behind which the lower portion of the base wall 26 of each reflector unit 25¹ is adapted to snap as shown in the broken line in order to hold the reflector unit 25¹ in position.

It has been found that the angle which the wall portions 45 make with the vertical should be approximately 15° in order to permit maximum reflection not only to the eyes of a pilot who is taxiing along the taxiway but in addition to the eyes of a pilot who is landing. As in the case of the other reflectors heretofore described, the surface portions 31 of each reflector unit 25¹ extend generally vertically.

In the reflector structure shown in FIG. 21, a housing 40¹ is utilized of similar material to that shown in FIGS. 17-20 and a reflector 49' having eight angularly related surfaces is snapped into an opening of the housing in the same manner. As contemplated in FIG. 21, two reflectors are provided on opposite elongated sides of the housing 40¹.

In the automobile shown in FIG. 22, reflectors 50 are provided along the sides of the automobile. As shown in FIGS. 23 and 24, the reflector comprises an outer wall 51 having a plurality of angularly related outer surfaces and retro-reflective prisms on the inner surface and an inner wall 52 hermetically sealed thereto. As shown in FIG. 24, the outer wall is connected to the peripheral wall 53 by tapered portions 54 that make the reflector self-cleaning. The reflectors 50 can be fastened to the body of the automobile or set into openings in the body of the automobile.

The manner in which the provision of the reflectors 50 functions to make the automobile visible by the headlights of another vehicle can most readily be understood by reference to FIGS. 29 and 30. As shown in FIG. 29, which is a diagrammatic plan view, the headlights from a vehicle V function to make the automobile with the reflectors 50 visible at wide angles because of the inherent characteristics of the reflector in being able to reflect light not only when light is directed thereon in a direction normal to the reflector but at acute angles thereto. Thus even though the headlights of the vehicle carrying the reflectors 50 are not visible or may not be visible, the reflectors 50 function to reflect light to the eyes of the driver of the vehicle V. FIG. 30 represents the manner in which the driver would view the reflectors at various angles, the center of the view representing the view of the reflectors head on, that is at a right angle to the longitudinal axis of the automobile being viewed while the designations to the right and left indicate the view of the reflectors at acute angles to the normal longitudinal axis of the automobile.

As in the case of the reflectors described in connection with FIGS. 1-16, the angular relation between the surfaces may range between 5 and 20° where no surfaces are provided parallel to the longitudinal axis of the automobile or may range from 20 to 30° if outer surfaces are provided parallel to the longitudinal axis of the automobile. The latter condition is shown in FIGS. 25 and 26 wherein because of the presence of flat surfaces 55, the angular surfaces 56 may form angles of 20 to 30° with the longitudinal axis of the automobile.

A similar relationship may exist in connection with the reflector shown in FIG. 26 which includes flat surfaces 58 and inclined or angularly related surfaces 59.

In the form of reflectors shown in FIGS. 27 and 28, a combination of angularly related surfaces are provided. Thus, the flat surface 61 which is parallel to the longitudinal axis of the automobile is at the center, inclined surface 62 is at an angle of 15° to the longitudinal axis, inclined surface 63 is at an angle 25° to the longitudinal axis of the automobile and inclined surface 64 is at an angle of 15° to the longitudinal axis of the automobile. The reflector shown in FIGS. 27 and 28 thus combine flat and inclined surfaces in a manner to produce not only a wide angle of reflection and thus visibility of the automobile but, in addition, a good visibility of the automobile when the headlights of the oncoming vehicle are at an angle normal to the longitudinal axis of the automobile which is carrying the reflectors.

Although I do not wish to be bound by the theory involved, in my opinion, an important factor in obtaining the beneficial results comprises having the outer wall of the reflector made in a single piece so that the outer surfaces of the outer wall are integrally connected to one another as shown in FIGS. 6, 7 and 28. In my opinion this facilitates the redirection of the light in the apex area of the reflector.

I claim:

1. A retro-reflective reflector comprising
    an inner wall,
    an outer wall of light transmitting material spaced from the inner wall and hermetically sealed at its periphery thereto,
    said outer wall having at least four wall portions, adjacent wall portions being angularly related to one another at an obtuse angle, each wall portion forming an acute angle with the inner wall,
    said wall portions having substantially flat outer surfaces with alternate flat outer surfaces being parallel to each other,
    said wall portions having inner surfaces opposite said flat surfaces, each formed with a plurality of symmetrical retro-reflective prisms thereon,
    the axes of said prisms being substantially perpendicular to the respective substantially flat outer surfaces.

2. The combination set forth in claim 1 wherein the acute angle which said wall portions form with said inner wall ranges between 5 and 30 degrees.

3. The combination set forth in claim 1 wherein said acute angle ranges between 20 and 30 degrees, said outer wall including at least one additional wall portion which is substantially parallel to said inner wall.

4. The combination set forth in claim 1 wherein the outer surfaces of said wall portion intersect in a substantially straight line, said prisms being symmetrically disposed on each side of said straight line and comprising
    an apex defined by three intersecting cubic surfaces,
    and a base defined by six lines connected in a hexagon,
    the intersection of at least two of said cubic surfaces forming an angle of approximately 90 degrees with said line of intersection of the outer surfaces of said wall,
    said prisms being oriented such that one of said cubic surfaces faces toward said line of intersection and is substantially parallel thereto.

5. The combination set forth in claim 1 including a roadway having a curved portion and a plurality of said retro-reflective reflectors mounted along said curved portion.

6. The combination set forth in claim 1 including a housing having a plurality of angularly related generally vertically extending walls,
    and a plurality of said retro-reflective reflectors mounted on said walls,
    and means for supporting said housing in spaced relation to the ground,
    each said retro-reflective unit is removably mounted in an opening in its respective wall,
    said housing being hollow and made of plastic.

7. The combination set forth in claim 6 wherein each said wall extends upwardly and inwardly relative to said housing such that the flat outer surfaces of each said reflector unit form an upwardly and inwardly extending acute angle with the vertical.

8. The combination set forth in claim 1 including a vehicle having side and end surfaces which are angularly related at a substantially right angle,
    each said surface having one of said retro-reflective reflectors at and adjacent to the intersection of said side and end surfaces.

References Cited

UNITED STATES PATENTS

| | | | |
|---|---|---|---|
| 1,591,572 | 7/1926 | Stimson | 350—102 |
| 1,787,388 | 12/1930 | McLean | 350—109 |
| 2,099,671 | 11/1937 | Bairey | 350—109 |
| 2,330,096 | 9/1943 | Waters | 350—106 |
| 2,703,773 | 3/1955 | Stimson | 350—103 X |

FOREIGN PATENTS

| | | |
|---|---|---|
| 132,462 | 4/1929 | Switzerland. |
| 197,155 | 7/1938 | Switzerland. |
| 511,106 | 7/1928 | Germany. |
| 609,270 | 5/1926 | France. |
| 749,537 | 5/1956 | Great Britain. |
| 759,860 | 2/1934 | France. |

DAVID SCHONBERG, Primary Examiner

PAUL R. GILLIAM, Assistant Examiner